(12) United States Patent
Wang (10) Patent No.: US 12,395,078 B2
(45) Date of Patent: Aug. 19, 2025

(54) CONTROL METHOD AND APPARATUS, AND ELECTRONIC DEVICE

(71) Applicant: Lenovo (Beijing) Limited, Beijing (CN)

(72) Inventor: Cheng Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 167 days.

(21) Appl. No.: 18/240,720

(22) Filed: Aug. 31, 2023

(65) Prior Publication Data

US 2024/0072658 A1 Feb. 29, 2024

(30) Foreign Application Priority Data

Aug. 31, 2022 (CN) .......................... 202211060496.2

(51) Int. Cl.
*H02M 3/155* (2006.01)
*H02J 7/00* (2006.01)

(52) U.S. Cl.
CPC ............. *H02M 3/155* (2013.01); *H02J 7/007* (2013.01)

(58) Field of Classification Search
CPC ................................. H02M 3/155; H02J 7/007
USPC ......................................................... 713/300
See application file for complete search history.

(56) References Cited

U.S. PATENT DOCUMENTS

| 5,617,004 | A | * | 4/1997 | Kaneko | ............... | H01M 10/441 320/152 |
|---|---|---|---|---|---|---|
| 5,991,839 | A | * | 11/1999 | Ninomiya | ............. | G06F 1/1632 713/340 |
| 6,288,522 | B1 | * | 9/2001 | Odaohhara | ......... | H02J 7/00714 320/137 |
| 6,952,783 | B2 | * | 10/2005 | Koertzen | .................. | G06F 1/26 713/300 |
| 8,555,093 | B2 | * | 10/2013 | Song | ..................... | G06F 1/1632 713/300 |
| 11,086,342 | B1 | * | 8/2021 | Kim | ........................ | H03K 5/24 |
| 2004/0125618 | A1 | * | 7/2004 | De Rooij | ............ | H02M 7/4807 363/17 |
| 2004/0217734 | A1 | * | 11/2004 | Shum | .................... | H02J 7/0016 320/116 |
| 2008/0143188 | A1 | * | 6/2008 | Adest | ...................... | H02M 7/42 307/82 |
| 2009/0179493 | A1 | * | 7/2009 | Yeh | ........................ | H02J 1/102 307/64 |

(Continued)

*Primary Examiner* — Paul R. Myers
(74) *Attorney, Agent, or Firm* — ANOVA LAW GROUP, PLLC (57) ABSTRACT

A control method includes: in response to detecting that a connection state of one or more power interfaces of an electronic device changes, determining power supply terminal information of one or more power supply terminals connected to the one or more power interfaces, the power supply terminal information including a terminal quantity of the one or more power supply terminals and power supply parameter information of the one or more power supply terminals; and configuring one or more control parameters of one or more charging power chips of the electronic device at least based on the power supply terminal information, each of the one or more charging power chips being disposed at one of one or more power supply paths between one of the one or more power interfaces and one of one or more power-consuming components of the electronic device.

19 Claims, 4 Drawing Sheets

(56) References Cited

U.S. PATENT DOCUMENTS

| | | | | |
|---|---|---|---|---|
| 2012/0200256 | A1* | 8/2012 | Tse | B60L 53/14 |
| | | | | 320/109 |
| 2014/0001849 | A1* | 1/2014 | Huang | H02J 7/34 |
| | | | | 320/101 |
| 2014/0298046 | A1* | 10/2014 | Tsai | G06F 1/266 |
| | | | | 713/300 |
| 2015/0180254 | A1* | 6/2015 | Zhao | G06F 1/263 |
| | | | | 320/107 |
| 2016/0190813 | A1* | 6/2016 | Kumar | H02M 3/158 |
| | | | | 307/18 |
| 2016/0352127 | A1* | 12/2016 | Prakash | H02J 9/062 |
| 2017/0185094 | A1* | 6/2017 | Atkinson | G06F 1/3243 |
| 2018/0001740 | A1* | 1/2018 | Vehr | B60H 1/3205 |
| 2018/0198368 | A1* | 7/2018 | Shaik | H02J 7/35 |
| 2019/0041934 | A1* | 2/2019 | Tan | G06F 1/266 |
| 2019/0140554 | A1* | 5/2019 | Cummings | H02M 1/14 |
| 2021/0083501 | A1* | 3/2021 | Kun | H02J 7/0047 |
| 2022/0344733 | A1* | 10/2022 | Zhou | H01M 10/44 |
| 2023/0023933 | A1* | 1/2023 | Qarish | H02J 9/04 |
| 2024/0022102 | A1* | 1/2024 | Notohamiprodjo | G06F 1/3237 |
| 2024/0388108 | A1* | 11/2024 | DiNardo | H02J 7/0048 |
| 2025/0070591 | A1* | 2/2025 | Mehrnami | H02J 9/06 |

\* cited by examiner

| 101 | In response to detecting that a connection state of one or more power interfaces of an electronic device changes, determining power supply terminal information of one or more power supply terminals connected to the one or more power interfaces, the power supply terminal information including a terminal quantity of the one or more power supply terminals and power supply parameter information of the one or more power supply terminals |

| 102 | Configuring one or more control parameters of one or more charging power chips of the electronic device at least based on the power supply terminal information, each of the one or more charging power chips being disposed at one of one or more power supply paths between one of the one or more power interfaces and one of one or more power-consuming components of the electronic device, each of the one or more control parameters at least being used to control power transmission between the one of the one or more charging power chips and the one of the one or more power-consuming components |

CONTROL METHOD AND APPARATUS, AND ELECTRONIC DEVICE

CROSS-REFERENCE TO RELATED APPLICATION

This application claims priority to Chinese Patent Application No. 202211060496.2, filed on Aug. 31, 2022, the entire content of which is incorporated herein by reference.

TECHNICAL FIELD

The present disclosure relates to the technical field of electrical and electronic technology and, more particularly, to a control method, a control apparatus, and an electronic device.

BACKGROUND

With the performance improvement and function expansion of electronic devices and the constant improvement of charging time requirement for batteries of electronic devices, the requirement on power adapters of electronic devices is also higher. Current solution is to improve the power adapter itself.

SUMMARY

One aspect of the present disclosure provides a control method. The control method includes: in response to detecting that a connection state of one or more power interfaces of an electronic device changes, determining power supply terminal information of one or more power supply terminals connected to the one or more power interfaces, the power supply terminal information including a terminal quantity of the one or more power supply terminals and power supply parameter information of the one or more power supply terminals; and configuring one or more control parameters of one or more charging power chips of the electronic device at least based on the power supply terminal information, each of the one or more charging power chips being disposed at one of one or more power supply paths between one of the one or more power interfaces and one of one or more power-consuming components of the electronic device, each of the one or more control parameters at least being used to control power transmission between the one of the one or more charging power chips and the one of the one or more power-consuming components.

Another aspect of the present disclosure provides a control apparatus. The control apparatus includes one or more processors; and one or more memories storing program instructions that, when executed by the one or more processors, cause the one or more processors to: in response to detecting that a connection state of one or more power interfaces of an electronic device changes, determine power supply terminal information of one or more power supply terminals connected to the one or more power interfaces, the power supply terminal information including a terminal quantity of the one or more power supply terminals and power supply parameter information of the one or more power supply terminals; and configure one or more control parameters of one or more charging power chips of the electronic device at least based on the power supply terminal information, each of the one or more charging power chips being disposed at one of one or more power supply paths between one of the one or more power interfaces and one of one or more power-consuming components of the electronic device, each of the one or more control parameters at least being used to control power transmission between the one of the one or more charging power chips and the one of the one or more power-consuming components.

Another aspect of the present disclosure provides an electronic device. The electronic device includes: one or more power interfaces for connecting to one or more power supply terminals; one or more power-consuming components; one or more charging power chips each disposed at a power supply path between one of the one or more power interfaces and one of the one or more power-consuming components; and a control circuit configured to: monitor power supply terminal information of the one or more power supply terminals; and configure one or more control parameters of the one or more charging power chips based on the power supply terminal information to control power transmission between the one or more charging power chips and the one or more power-consuming components, the power supply terminal information including a terminal quantity of the one or more power supply terminals and power supply parameter information of the one or more power supply terminals.

DETAILED DESCRIPTION OF THE EMBODIMENTS

In order to make the objectives, technical solutions, and advantages of the present disclosure clearer, the present disclosure will be further described in detail below with reference to the accompanying drawings. Obviously, the described embodiments are only some of the embodiments of the present disclosure, not all of the embodiments. Based on the embodiments of the present disclosure, all other embodiments obtained by those of ordinary skill in the art without creative efforts shall fall within the scope of the present disclosure.

The technical solution of the present disclosure will be further described in detail below in conjunction with the accompanying drawings and specific embodiments.

To better describe the technical solution, application scenarios of the present disclosure is briefly introduced. The present disclosure can be applied to an electronic device with multiple interfaces. The multiple interfaces of the electronic device can be a USB Type-C interface, or other types of interfaces such as USB Type-A or Type-B, or other applicable interface. Currently, the USB Type-C interface provides a fast-charging function. As such, the USB Type-C interface is used primarily. However, the present disclosure does not limit the type of the interface in actual applications. The electronic device primarily consumes power for system (VSYS) and batteries.

Figure 1:
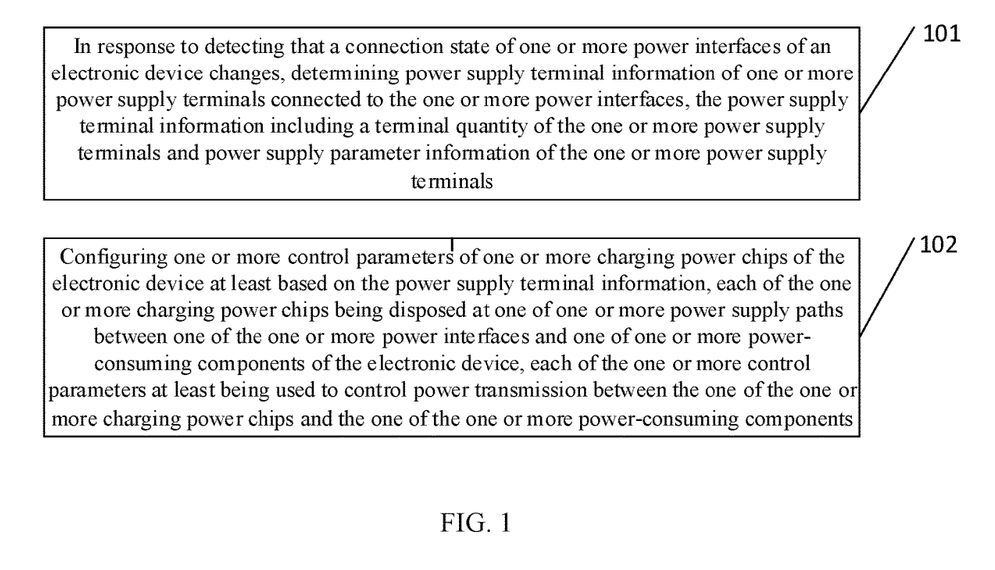
FIG. 1 is a flowchart of an exemplary control method according to some embodiments of the present disclosure.

FIG. 1 is a flowchart of an exemplary control method according to some embodiments of the present disclosure.

Referring to FIG. 1, the control method includes at least the following processes. At 101, in response to detecting that a connection state of a power interface of an electronic device changes, power supply terminal information of a power supply terminal connected to the power interface is determined. The power supply terminal information includes a quantity of power supply terminals (also referred to as a "terminal quantity") and power supply parameter information of the power supply terminals. One or more power interfaces may be provided. At 102, at least based on the power supply terminal information, control parameters of a charging power chip of the electronic device are configured. The charging power chip is provided at a power supply path between the power interface and a power-consuming component of the electronic device. The control parameters are at least used to control power transmission between the charging power chip and the power-consuming component.

At 101, in response to detecting that the connection state of the power interface of the electronic device changes, the power supply terminal information of the power supply terminal connected to the power interface is determined. The power supply terminal information includes the quantity of power supply terminals and the power supply parameter information of the power supply terminals. One or more power interfaces may be provided.

In some embodiments, the change of the connection state of the power interface may include that the power supply terminal is plugged into or unplugged from the power interface. Here, a power supply terminal connected to the power interface may refer to a power supply terminal newly connected to the power interface of the electronic device, a power supply terminal connected to the power interface of the electronic device prior to a current moment and remaining connected at the current moment, or a power supply terminal remaining connected to the power interface of the electronic device after one or more of the multiple power supply terminals previously connected to the power interface of the electronic device are unplugged. Thus, the quantity of power supply terminals indicated in the power supply terminal information may refer to the quantity of power supply terminals that are currently connected.

In some embodiments, the power supply terminal may be a power adapter connected to the power interface, or may be a power supply terminal of another device capable of supplying power, such as: an all-in-one (AIO) computer, a desktop computer, a television (TV) set, a large-screen display, etc. Thus, the power supply parameter information of the power supply terminal here may include power supply information of the power adapter, such as, wattage and current of the power adapter, and may also include the power supply information of other devices capable of supplying power, such as, the wattage and current of the AIO computer, the desktop computer, the TV set, and the large-screen display.

At 102, the control parameters of the charging power chip of the electronic device are configured at least based on the power supply terminal information. The charging power chip is provided at the power supply path between the power interface and the power-consuming component of the electronic device. The control parameters are at least used to control the power transmission between the charging power chip and the power-consuming component.

In some embodiments, the power supply terminal may be connected through the power interface of the electronic device, such that the power supply terminal can be used to supply power to the electronic device. The power interface of the electronic device can also be connected to a to-be-powered device that needs to be powered, such that the electronic device supplies power to the to-be-powered device. Here, the to-be-powered device is regarded as a power receiving terminal.

In some embodiments, the control parameters of the charging power chip of the electronic device can be configured only based on the power supply terminal information. Further, the control parameters of the charging power chip of the electronic device can also be configured based on the power supply terminal information in combination with power supply demand information of the power-consuming component and the power supply information of the electronic device that supplies power to an external device.

For example, the charging power chip may be a charger (charging control module) used to control a charging process of the electronic device. The control parameters of the charging power chip of the electronic device may be configured by controlling power consumption parameters of the charger according to the power supply terminal information to control the charger to enter a HIZ (suspension) state or exit the HIZ state, and by writing parameters such as an input current of the power adapter of the electronic device, a charging voltage and a charging current of the batteries of the electronic device into a register of the charger. The HIZ state refers to a high-impedance output state of a circuit, which is neither high voltage level nor low voltage level. Inputting the high-impedance state to a subsequent circuit has no effect on the subsequent circuit, and can be treated as an open circuit state.

In some embodiments, the power-consuming component may include a motherboard terminal and a redundant power supply terminal of the electronic device. For example, the motherboard terminal may be a system load (VSYS) of the electronic device, and the redundant power supply terminal may include the batteries of the electronic device, a backup power supply, and other power-consuming components that need to be powered. The power transmission between the charging power chip and the power-consuming component may be that two or more power adapters are connected to the power interface of the electronic device to supply power to the electronic device at the same time. Supplying power to the electronic device includes supplying power to the system load of the electronic device and charging the batteries of the electronic device. According to power supply demand requirement of the electronic equipment, supplying power to the electronic device may include only supplying power to the system load of the electronic device or only charging the batteries of the electronic device. Supplying power to the electronic device may also include both supplying power to the system load of the electronic device and charging the batteries of the electronic device.

In some embodiments, configuring the control parameters of the charging power chip of the electronic device based at least on the power supply terminal information includes at least one of the following processes.

1. Controlling an on-off state of a power supply path between the power interface and the charging power chip based on the quantity of power supply terminals, and configuring the control parameters of the charging power chip based on the power supply parameter information of the power supply terminals. One or more charging power chips may be provided.

In some embodiments, power or current may be distributed mainly based on the number of charging control chips of the electronic device and the number of power adapters connected to the power interface of the electronic device. One or more charging control chips may be provided.

For example, the power supply terminal is a power adapter of an electronic device. A power delivery (PD, power supply control) control chip on the motherboard may detect an output power, an output voltage, and an output current of the power adapter, and based on the number of charging power chips, parameters such as wattage or current for supplying power to the electronic device are written into the charging power chips. For example, if the electronic device has only one charging power chip, a first supply power and a first supply current for supplying power to the system load of the electronic device and a charging power and a charging current for charging the batteries may be written onto the one charging power chip.

2. Controlling the on-off state of the power supply path between the power interface and the charging power chip based on the quantity of power supply terminals, and configuring the control parameters of the charging power chip based on the power supply parameter information of the power supply terminals and power consumption parameter information of the power-consuming component. One or more charging power chips may be provided.

In some embodiments, the power or the current may be distributed based on the number of charging control chips of the electronic device and the number of power adapters connected to the power interface of the electronic device, and further based on the system load and battery load of the electronic device. One or more charging power chips may be provided.

For example, the power supply terminal is the power adapter of the electronic device. The PD control chip on the motherboard detects that two power adapters supply power to the electronic device at the same time, and detects information such as the output power, the output voltage, and the output current of the power adapter. An embedded controller (EC) communicates with the PD control chip and obtains the information from the PD control chip. Further, the EC may determine, based on the system load and the battery load of the electronic device and the number of charging power chips, power supply parameters such as the wattage or the current for powering the electronic device that need to be written into the charging power chip.

For example, if the electronic device has two charging power chips, an output terminal of one charging power chip is connected to a power supply input terminal of the batteries and an output terminal of the other charging power chip is connected to a power supply input terminal of the system load. A current battery capacity is detected to be greater than a first capacity threshold, and no charging is required. However, the system load is greater than a first load threshold, and the system load is considered to be in a heavy load state. Thus, the power supply parameters such as the output power, the output voltage, and the output current of the power adapter may be obtained through the PD control chip of the electronic device, and the power supply parameters such as the output currents of the two power adapters may be written into the charging power chip connected to the power supply input terminal of the system load, such that the system load of electronic device can be powered.

3. Controlling the on-off state of the power supply path between the power interface and the charging power chip based on the number of power supply terminals, and configuring the control parameters of the charging power chip based on the power supply parameter information of the power supply terminals and the power supply demand information of an external device connected to the electronic device. One or more charging power chips may be provided.

In some embodiments, the power or the current may be distributed based on the number of charging control chips of the electronic device and the number of power adapters connected to the power interface of the electronic device, and further based on the load of the external device connected to the electronic device. One or more charging power chips may be provided.

Here, when the electronic device has an external device load, the electronic device may be in a power-off state or a sleep state. The external device load may be terminal devices such as a mobile phone, an AIO computer, a display screen, a camera, and a conference terminal, etc. The external device load may be connected to the electronic device through the power interface of the electronic device. The electronic device may obtain power through its internal batteries or a power adapter connected to the electronic device, and may transmit power to the external device load through the charging power chip.

4. Controlling the on-off state of the power supply path between the power interface and the charging power chip based on the number of power supply terminals, and configuring the control parameters of the charging power chip based on at least one of the power consumption parameter information of the power-consuming component or the power consumption demand information of the external device connected to the electronic device, and the power supply parameter information of the power supply terminals. One or more charging power chips may be provided.

In some embodiments, the power or the current may be distributed based on the number of charging control chips of the electronic device and the number of power adapters connected to the power interface of the electronic device, and further based on the system load of the electronic device, the battery load, and external device load. One or more charging power chips may be provided.

Here, when the electronic device has an external device load, the electronic device may be in a power-on state, or in the power-off or the sleep state. The external device load may be terminal devices such as a mobile phone, an AIO computer, a display screen, a camera, and a conference terminal, etc.

In some embodiments, configuring the control parameters of the charging power chip of the electronic device based on at least the power supply terminal information further includes: controlling the connection state between the power interfaces and the on-off state of the power supply path between the power interface and the charging power chip based on the number of power supply terminals. One or more charging power chip may be provided.

In some embodiments, a controllable load switch may be configured between any two power interfaces. In this way, based on the number of power supply terminals, the connection state between the power interfaces may be controlled through an on-off state of the controllable load switch. The controllable load switch may be a pair of MOS transistors connected back-to-back.

Further, in some other embodiments, an electronic switch is also arranged between the power interface and the charging power chip. Through controlling the on-off states of the controllable load switch and the electronic switch, the connection state between the power interfaces, and the on-off state of the power supply path between the power interface and the charging power chip can be controlled based on the number of power supply terminals. The electronic switch may be a pair of MOS transistors connected back-to-back.

In some embodiments, in response to a first power interface in the power interface being connected to an only first power supply terminal, the control parameters of a first charging power chip and a second charging power chip of the electronic device may be configured based on the obtained power supply parameter information of the first power supply terminal, such that after the power supply path between the first power interface and the first charging power chip and the power supply path between the first power interface and the second charging power chip are turned on, power is supplied to a first power-consuming component connected to the first charging power chip, and a second power-consuming component connected to the second charging power chip.

For example, a power adapter may be connected to the electronic device through the power interface of the electronic device. The PD control chip on the motherboard of the electronic device detects the output power, the output voltage, and the output current of the power adapter. At this time, the EC communicates with the PD control chip to obtain the output power, the output voltage, and the output current of the power adapter, and sets the first charging power chip and the second charging power chip of the electronic device into the HIZ state, such that parameters such as the output power, the output voltage, and the output current of the power adapter are written into registers of the first charging power chip and the second charging power chip. After the power supply path between the first power interface and the first charging power chip and the power supply path between the first power interface and the second charging power chip are turned on through adjusting the on-off state of the controllable load switch disposed between the power interfaces and the on-off state of the electronic switch disposed between the power interfaces and the charging power chips, power is supplied to the first power-consuming component connected to the first charging power chip, and the second power-consuming component connected to the second charging power chip.

In some embodiments, if feedback information of the first power-consuming component and/or the second power-consuming component is obtained, the control parameters of the first charging power chip and the second charging power chip are updated based on the feedback information. If the first power supply terminal cannot meet the power demand of the first power-consuming component, the second power-consuming component is controlled to supply power to the first power-consuming component. For example, the feedback information of the first power-consuming component and the second power-consuming component may be current capacity information of the first power-consuming component and the second power-consuming component, respectively. For example, the first power-consuming component is the batteries of the electronic device, and the feedback information may be a percentage of a current battery capacity over a rated battery capacity.

Figure 3:
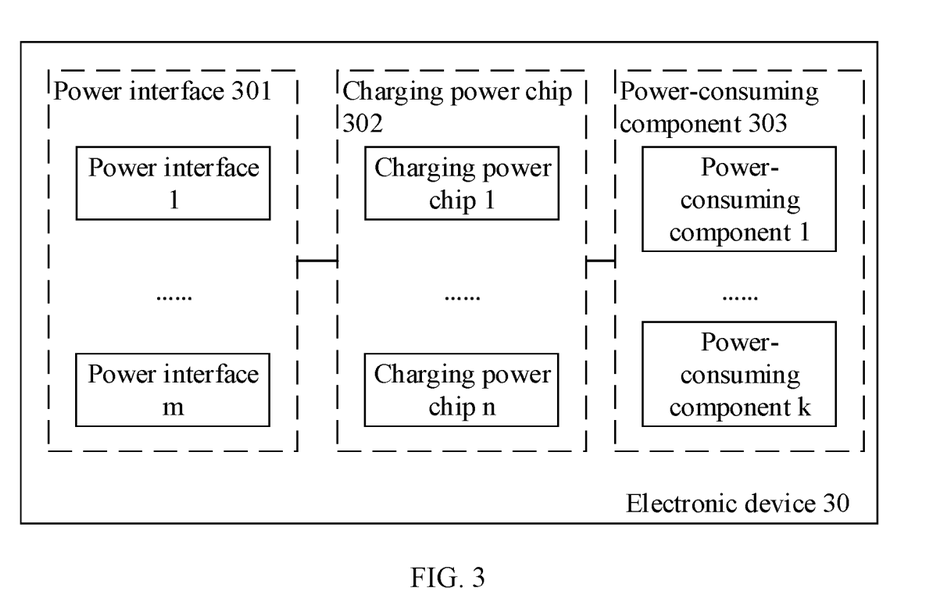
FIG. 3 is a schematic structural diagram of an exemplary electronic device according to some embodiments of the present disclosure.
Figure 5:
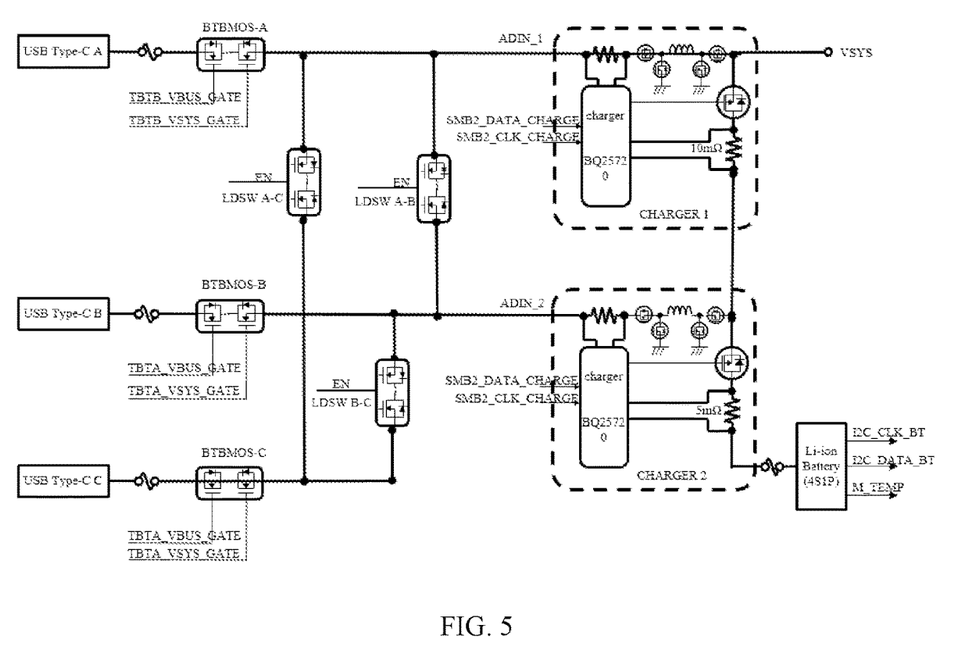
FIG. 5 is a schematic diagram showing operation principle of an exemplary electronic device according to some embodiments of the present disclosure.

For example, the first power-consuming component may be the system load of the electronic device, and the second power-consuming component may be batteries of the electronic device. If the system load increases and the current power supply of the power adapter to the system load cannot meet an operation demand of the system load, the batteries may be controlled to supply power to the system load at the same time. The connection relationship between the first charging power chip and the second charging power chip will be described below in conjunction with the schematic structural diagram of the electronic device as shown in FIG. 3 and the schematic diagram showing operation principle of the electronic device as shown in FIG. 5, and the descriptions thereof will not be repeated herein.

In some embodiments, in response to the first power interface in the power interface being connected to the first power supply terminal and the second power interface in the power interface being connected to the second power supply terminal, based on the obtained power supply parameter information of the first power supply terminal and the second power supply terminal, the control parameters of the first charging power chip and the second charging power chip of the electronic device are configured respectively. After the power supply path between the first power interface and the first charging power chip and the power supply path between the second power interface and the second charging power chip are turned on, power is supplied to the first power-consuming component connected to the first charging power chip and the second power-consuming component connected to the second charging power chip, respectively.

In some embodiments, if the feedback information of the first power-consuming component and/or the second power-consuming component is obtained, the control parameters of the first charging power chip and the second charging power chip are updated based on the feedback information. If the first power supply terminal cannot meet the power demand of the first power-consuming component, the second power supply terminal and/or the second power-consuming component are controlled to supply power to the first power-consuming component.

Further, in some embodiments, if the power demand of the external device connected to the electronic device is obtained, the first power-consuming component and/or the second power-consuming component are controlled through the first charging power chip and/or the first charging power chip to supply power to the external device.

Specifically, the process of controlling the first power-consuming component and/or the second power-consuming component to supply power to the external device will be described below in conjunction with the schematic structural diagram of the electronic device as shown in FIG. 3 and the schematic diagram showing operation principle of the electronic device as shown in FIG. 5, and the descriptions thereof will not be repeated herein.

Similarly, based on the above control method, the present disclosure also provides a computer-readable storage medium. The computer-readable storage medium stores a program. When being executed by a processor, the program causes the processor to at least perform the following processes. At 101, in response to detecting that the connection state of the power interface of the electronic device changes, the power supply terminal information of the power supply terminal connected to the power interface is determined. The power supply terminal information includes the quantity of power supply terminals and the power supply parameter information of the power supply terminals. One or more power interfaces may be provided. At 102, the control parameters of the charging power chip of the electronic device are configured at least based on the power supply terminal information. The charging power chip is provided at the power supply path between the power interface and the power-consuming component of the electronic device. The control parameters are at least used to control the power transmission between the charging power chip and the power-consuming component.

Figure 2:
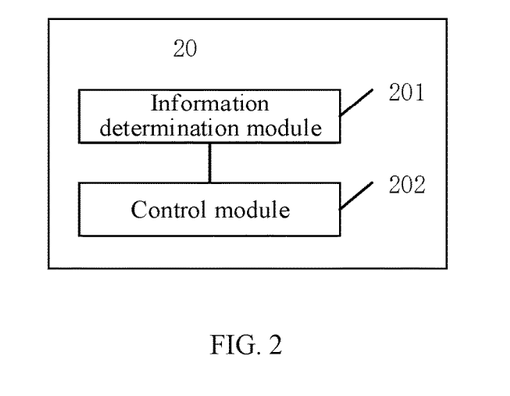
FIG. 2 is a schematic structural diagram of an exemplary control apparatus according to some embodiments of the present disclosure.

Further, based on the above control method, the present disclosure also provides a control apparatus. As shown in FIG. 2, the control apparatus 20 includes: an information determination module 201 and a control module 202. The information determination module 201 is configured to determine the power supply terminal information of the power supply terminal connected to the power interface in response to the detection of a change in the connection state of the power interface of the electronic device. The power supply terminal information includes the number of power supply terminals and the power supply parameter information of the power supply terminals. One or more power interfaces are provided. The control module 202 is used to configure the control parameters of the charging power chip of the electronic device at least based on the power supply terminal information. The charging power chip is disposed in the power supply path between the power interface and the power-consuming component of the electronic device. The control parameters are at least used to control the power transmission between the charging power chip and the power-consuming component.

FIG. 3 is a schematic structural diagram of an exemplary electronic device according to some embodiments of the present disclosure.

Referring to FIG. 3, the electronic device 30 includes: a plurality of power interfaces 301 for at least one power supply terminal (not shown) to plug in; at least one charging power chip 302 disposed at the power supply path between the plurality of power interfaces and a plurality of power-consuming component 303 of the electronic device; a control circuit (not shown) capable of monitoring the power supply terminal information of the power supply terminals connected to the plurality of power interfaces 301, and configuring the at least one charging power chip 302 based on the power supply terminal information. The control parameters are used to control the power transmission between the at least one charging power chip 302 and the plurality of power-consuming components 303. The power supply terminal information includes the number of power supply terminals and the power supply parameter information of the power supply terminals.

The number m of the power interfaces 301, the number n of the charging power chips 302, and the number k of the power-consuming components 303 may be determined according to actual application scenarios. Any two of the number m of the power interfaces 301, the number n of the charging power chips 302, and the number k of the power-consuming components 303 may be the same or different.

The connection relationship between the plurality of power interface 301, the least one charging power supply chip 302, and the plurality of power-consuming components 303 as illustrated in FIG. 3 is exemplary. Any of the plurality of power interfaces may be connected to any of the at least one charging power chip 302, and any of the at least one charging power chip 302 may be connected to any of the plurality of power-consuming components 303. In addition, a power-consuming component with an electric energy storage function may also be connected to a power-consuming component without the electric energy storage function through a charging power chip 302. For example, the batteries of the electronic device are a power-consuming component with the electric energy storage function. The batteries need to be connected to the power supply terminal through the connection between the power interface and the power supply terminal to charge the batteries through the power supply terminal. Or, the batteries are connected to an external load through the power supply terminal to supply the power of the batteries to the external load. The batteries may also be connected to a system load inside the electronic device to supply the power of the batteries to the system load when the output power of the external power supply terminal does not meet the system load demand or the system load is heavy. Thus, the batteries can also be connected to the system load through a charging power chip.

Figure 4:
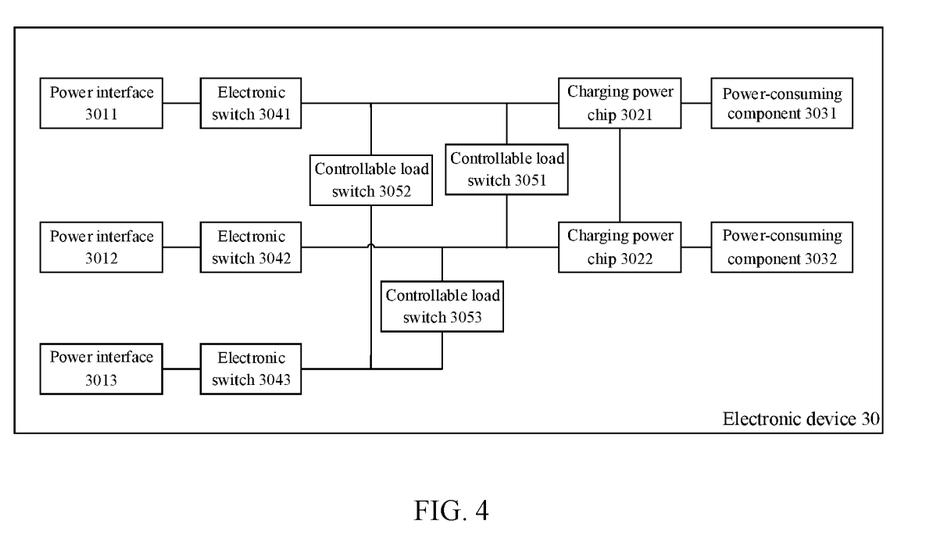
FIG. 4 is a schematic diagram showing composition of an exemplary electronic device according to some embodiments of the present disclosure.

FIG. 4 is a schematic diagram showing composition of an exemplary electronic device according to some embodiments of the present disclosure.

As shown in FIG. 4, the electronic device 30 includes three power interfaces: a power interface 3011, a power interface 3012, and a power interface 3013. The three power interfaces may all be USB Type-C interfaces, or may all be another applicable type of power interfaces, or may be different types of power interfaces. The electronic device 30 includes two charging power chips 3021 and 3022. The electronic device 30 includes two power-consuming components 3031 and 3032.

For example, the electronic device 30 includes an electronic switch 3041 disposed between the power interface 3011 and the charging power chip 3021, an electronic switch 3042 disposed between the power interface 3012 and the charging power chip 3022, and an electronic switch 3043 disposed between the power interface 3013 and the charging power chip 3022. The electronic device 30 further includes a controllable load switch 3051 disposed between the power interface 3011 and the power interface 3012, a controllable load switch 3052 disposed between the power interface 3012 and the power interface 3013, and a controllable load switch 3053 disposed between the power interface 3013 and the power interface 3011.

Other implementation details of the electronic device shown in FIG. 3 and FIG. 4 are similar to the implementation details of 101 and 102 in the embodiment shown in FIG. 1, and will not be repeated herein.

FIG. 5 is a schematic diagram showing operation principle of an exemplary electronic device according to some embodiments of the present disclosure.

As shown in FIG. 5, the electronic device is a notebook computer including three USB Type-C interfaces: USB Type-C A, USB Type-C B, and USB Type-C C. The electronic device includes two chargers CHARGER1 and CHARGER2 in a primary-secondary arrangement. CHARGER1 is the master charger. The output of CHARGER1 is divided into two channels, one for powering the system load (VSYS), and the other for powering the batteries after being connected to the output of CHARGER2 that serves as a secondary charger. The two chargers are equipped with a charging power chip BQ25720 respectively. The model of the charging power chip may be selected according to actual needs, and the present disclosure does not limit it.

A controllable load switch (Load Switch) is added between any two Type-C interfaces. Specifically, LDSW A-B is added between the USB Type-C A interface and the USB Type-C B interface, LDSW A-C is added between the USB Type-C A interface and the USB Type-C C interface, and LDSW B-C is added between the USB Type-C B interface and the USB Type-C C interface. LDSW A-B, LDSW A-C, and LDSW B-C may all be controllable load switches capable of bidirectional conduction. But the controllable load switches capable of bidirectional conduction cost slightly higher than unidirectional conduction load switches. Here, in the case of meeting usage requirements, LDSW A-B may be a bidirectional conduction load switch, and LDSW A-C and LDSW B-C may be a unidirectional conduction load switch. Parameters of the controllable load switches may be determined according to the parameters of power adapters.

In addition, a pair of back-to-back MOSFETs (i.e., back-to-back MOS transistors) functioning as an electronic switch are added between an output terminal of the USB Type-C power interfaces and each of the chargers.

In this way, the general-purpose input/output (GPIO) of the embedded controller (EC) of the notebook computer may be used to control on-off states of the above three controllable load switches. Further, values of registers of the two chargers may be modified according to the input currents and the charging currents of the power adapters connected to the three USB Type-C interfaces respectively. The electronic switches BTBMOS-A, BTBMOS-B and BTBMOS-C that are connected to the three USB Type-C interfaces operate in coordination and adjust control logic, such that any two Type-C interfaces can supply power to the notebook computer at the same time.

When the power of the system load VSYS exceeds the output power of the power adapter connected to the notebook computer, the controllable load switch LDSW A-B connected between CHARGER1 and CHARGER2 is controlled to be turned on, such that the batteries and the power adapter supply power to the system load VSYS at the same time.

Figure 6:
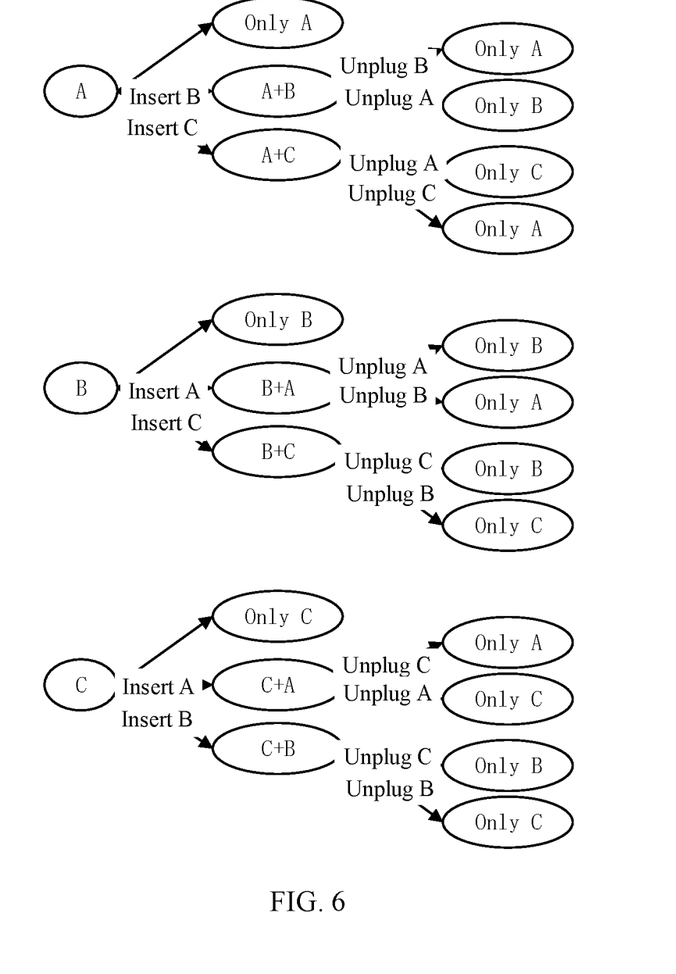
FIG. 6 is a schematic diagram showing connection states of one or more power interfaces of an exemplary electronic device according to some embodiments of the present disclosure.

FIG. 6 is a schematic diagram showing connection states of one or more power interfaces of an exemplary electronic device according to some embodiments of the present disclosure.

Referring to FIG. 6, the power interfaces USB Type-C A, USB Type-C B, and USB Type-C C are abbreviated as A, B, and C, respectively. In the application scenarios of the electronic device, the connection states of multiple power interfaces may include that when one power supply terminal is plugged into the power interface, another power supply terminal is inserted into another power supply terminal. The connection states may also include that when two power supply terminals are respectively inserted into the corresponding power interfaces, one of the corresponding power supply terminals is unplugged from one of the two power interfaces. The power supply terminal connected to the power interface may be a power adapter or an uninterrupted power supply (UPS) for providing power to the notebook computer, and may also be a terminal device such as a mobile phone or an external load such as batteries, that supplies power to an external load through the notebook computer.

FIG. 6 does not show scenarios that none of the USB Type-C power interfaces is connected or no power supply terminal is connected to any of the USB Type-C power interfaces. But these scenarios exist in actual applications.

With reference to FIG. 5 and FIG. 6, taking the power supply terminal being connected to the power interface of the notebook computer as an example, a power supply process corresponding to the connection state of the power interfaces shown in FIG. 6 is described below.

First, the control logic for a power adapter supplying power to a notebook computer is described.

Before the power adapter is plugged into the notebook computer, the three electronic switches BTBMOS-A, BTBMOS-B and BTBMOS-C connected to the three USB Type-C power interfaces, and the three controllable load switches LDSW A-B, LDSW A-C and LDSW B-C are preset to a low level (LOW) state or an off state.

When the power adapter A is inserted, the PD control chip on the motherboard detects the power supply terminal information such as the output power, the output voltage, and the output current of the corresponding power adapter. The EC communicates with the PD chip to obtain the power supply terminal information. Further, the EC controls CHARGER1 and CHARGER2 to enter the HIZ state, writes the power supply terminal information such as the input current of the power adapter into the registers of CHARGER1 and CHARGER2, and releases the HIZ state of CHARGER1 and CHARGER2. Further, the electronic switch BTBMOS-A is controlled to be turned on, the load switch LDSW A-B is controlled to be turned on, and an enable signal EN of the load switch LDSW A-B is set to HIGH.

When power is supplied to the system load normally and the battery capacity is not up to 100%, the batteries may send a charging request signal to CHARGER2. The charging request signal carries a charging voltage and a charging current of the batteries. After the EC receives the charging request signal from CHARGER2, the charging voltage and the charging current of the batteries are written into the registers of CHARGER1 and CHARGER2. When the system load VSYS is heavy and the current power adapter cannot meet the power demand of the system load, the controllable load switch LDSW A-B connected between CHARGER1 and CHARGER2 is controlled to be turned on, such that both the batteries and the power adapter supply power to the system load VSYS at the same time.

Then, the control logic for the two power adapters to supply power to the notebook computer is described.

When a power adapter is inserted into the notebook computer through the power interface USB Type-C A, the electronic switch BTBMOS-A and the controllable load switch LDSW A-B are both in the on state and the enable signal is set to HIGH. However, the two controllable load switches LDSW A-C and LD SW B-C are in the off state, and their enabling signals are set to LOW. At this time, when another power adapter is inserted into the power interface USB Type-C B, the PD control chip on the motherboard detects the power supply terminal information such as the output power, the output voltage, and the current of the power adapter, and the EC communicates with the PD control chip to obtain the power supply terminal information. The EN signal of the controllable load switch LDSW A-B is set to LOW. The controllable load switch LDSW A-B is disconnected. The input current of the power adapter connected to the notebook computer through the power interface USB Type-C A is written into the register of CHARGER1. The input current of the power adapter connected to the notebook computer through the power interface USB Type-C B is written into the register of CHARGER2. The electronic switch BTBMOS-B is controlled to be turned on.

When power is supplied to the system load VSYS normally and the battery capacity is not up to 100%, the batteries may send the charging request signal to CHARGER2. After receiving the charging request signal from CHARGER2, the EC writes the charging voltage and the charging current of the power adapter into the registers of CHARGER1 and CHARGER2. When the system load VSYS is heavy and the current adapter cannot meet the power demand of the system load, the controllable load switch LDSW A-B connected between CHARGER1 and CHARGER2 is controlled to be turned on, such that both the batteries and the power adapter supply power to the system load VSYS at the same time.

Finally, the control logic for unplugging one of the two power adapters when the two power adapters are powering the notebook computer is described.

When the power adapter connected through the power interface USB Type-C A and the power adapter connected through the power interface USB Type-C B supply power to the notebook computer at the same time, the electronic switch BTBMOS A, the electronic switch BTBMOS B, and the load switch LDSW A-B are all in the on state (HIGH), and the two controllable load switches LDSW A-C and LD SW B-C are in the off state (LOW). At this time, the power adapter connected through the power interface USB Type-C A is removed, the PD control chip on the motherboard detects that the power adapter connected through the power interface USB Type-C A has been pulled out, and the electronic switch BTBMOS A is automatically disconnected. EC detects that the electronic switch BTBMOS A is disconnected, writes the equally divided output current of the power adapter connected through the power interface USB Type-C B into the registers of CHARGER1 and CHARGER2, sets the enable signal EN of LDSW A-B to LOW, and controls the load switch LDSW A-B to be turned on. When power is supplied to the system load VSYS normally and the battery capacity is not up to 100%, the batteries may send the charging request signal to CHARGER2. After receiving the charging request signal from CHARGER2, EC writes the charging voltage and the charging current of the power adapter into the registers of CHARGER1 and CHARGER2. When the system load VSYS is heavy and the current power adapter cannot meet the power demand of the system load, the controllable load switch LD SW A-B connected between CHARGER1 and CHARGER2 is controlled to be turned on, such that both the batteries and the power adapter supply power to the system load VSYS at the same time.

The following is a brief description of the control logic for the connection states of multiple power interfaces as shown in FIG. 6.

The scenario that only one power adapter is inserted:

1. The power adapter is inserted into the power interface USB Type-C A.

The power adapter is inserted into the power interface USB Type-C A. EC writes the power supply parameters of the power adapter into the registers of CHARGER1 and CHARGER2, sets the state of the electronic switch BTBMOS A from LOW to HIGH, and sets the enable signals EN of the controllable load switches LDSW A-C and LDSW B-C to LOW. LDSW A-C and LDSW B-C are in the off state. The enable signal EN of LDSW A-B is set to HIGH, and LDSW A-B is in a conduction state.

2. The power adapter is inserted into USB Type-C B.

The power adapter is inserted into USB Type-C B. EC writes the power supply parameters of the power adapter into the registers of CHARGER1 and CHARGER2, sets the state of the electronic switch BTBMOS B from LOW to HIGH, and sets the enable signals EN of the controllable load switches LDSW A-C and LDSW B-C to LOW. LDSW A-C and LDSW B-C are in the off state. The enable signal EN of LDSW A-B is set to HIGH, and LDSW A-B is in the conduction state.

3. The power adapter is inserted into USB Type-C C.

The power adapter is inserted into USB Type-C C. EC writes the power supply parameters of the power adapter into the registers of CHARGER1 and CHARGER2, sets the state of the electronic switch BTBMOS C from LOW to HIGH, and sets the enable signals EN of the controllable load switches LDSW A-C and LDSW B-C to HIGH. LDSW A-C and LDSW B-C are in the conduction state. The enable signal EN of LDSW A-B is set to HIGH, and LDSW A-B is in the off state.

The scenario that two power adapters are inserted

1. After a power adapter is inserted into USB Type-C A, another power adapter is inserted into USB Type-C B.

In response to inserting a power adapter into USB Type-C A, the EC modifies the power supply parameters that have been written into the register of CHARGER1 according to the power supply parameters of the power adapter, writes the power supply parameters into the register of CHARGER2, sets the state of the electronic switch BTBMOS B to HIGH, sets the enable signals EN of the controllable load switches LDSW A-C, LDSW B-C, and LDSW A-B to LOW, and controls LDSW A-C, LDSW B-C and LDSW A-B to be in the off state.

2. After a power adapter is inserted into USB Type-C B, another power adapter is inserted into USB Type-C A.

In response to inserting a power adapter into USB Type-C B, the EC modifies the power supply parameters that have been written into the register of CHARGER2 according to the power supply parameters of the power adapter, writes the power supply parameters into the register of CHARGER1, sets the state of the electronic switch BTBMOS A to HIGH, sets the enable signals EN of the controllable load switches LDSW A-C, LDSW B-C, and LDSW A-B to LOW, and controls LDSW A-C, LDSW B-C and LDSW A-B to be in the off state.

3. After a power adapter is inserted into USB Type-C A, another power adapter is inserted into USB Type-C C.

In response to inserting a power adapter into USB Type-C A, EC modifies the power supply parameters that have been written into the register of CHARGER1 according to the power supply parameters of the power adapter, writes the power supply parameters into the register of CHARGER2, sets the state of the electronic switch BTBMOS C to HIGH, sets the enable signals EN of the controllable load switches LDSW A-C and LDSW A-B to LOW, controls LDSW A-C and LDSW A-B to be in the off state, sets the enable signal EN of the controllable load switch LDSW B-C to HIGH, and controls LDSW B-C to be in the conduction state.

4. After a power adapter is inserted into USB Type-C B, another power adapter is inserted into USB Type-C C.

In response to inserting a power adapter into USB Type-C B, EC modifies the power supply parameters that have been written into the register of CHARGER2 according to the power supply parameters of the power adapter, writes the power supply parameters into the register of CHARGER1, sets the state of the electronic switch BTBMOS C to HIGH, sets the enable signals EN of the controllable load switches LDSW A-C and LDSW B-C to HIGH, controls LDSW A-C and LDSW B-C to be in the conduction state, sets the enable signal EN of the controllable load switch LDSW B-C to LOW, and controls LDSW B-C to be in the off state.

5. After a power adapter is inserted into USB Type-C C, another power adapter is inserted into USB Type-C A.

In response to inserting a power adapter into USB Type-C C, EC modifies the power supply parameters that have been written into the register of CHARGER2 according to the power supply parameters of the power adapter, writes the power supply parameters into the register of CHARGER1, sets the state of the electronic switch BTBMOS A to HIGH, sets the enable signals EN of the controllable load switches LDSW A-C and LDSW A-B to LOW, controls LDSW A-C and LDSW A-B to be in the off state, sets the enable signal EN of the controllable load switch LDSW B-C to HIGH, and controls LDSW B-C to be in the conduction state.

6. After a power adapter is inserted into USB Type-C C, another power adapter is inserted into USB Type-C B.

In response to inserting a power adapter into USB Type-C C, EC modifies the power supply parameters that have been written into the register of CHARGER1 according to the power supply parameters of the power adapter, writes the power supply parameters into the register of CHARGER2, sets the state of the electronic switch BTBMOS B to HIGH, sets the enable signals EN of the controllable load switches LDSW B-C and LDSW A-B to LOW, controls LDSW B-C and LDSW A-B to be in the off state, sets the enable signal EN of the controllable load switch LDSW A-C to HIGH, and controls LDSW A-C to be in the conduction state.

The scenario that two power adapters are inserted and one the two power adapters is pulled out 1. After two power adapters are inserted into USB Type-C A and USB Type-C B respectively, the power adapter inserted into USB Type-C A is pulled out.

In response to inserting two power adapters into USB Type-C A and USB Type-C B respectively, EC rewrites the power supply parameters into the registers of CHARGER1 and CHARGER2 respectively according to the power supply parameters of the two power adapters. EC sets the state of the electronic switch BTBMOS A to LOW, disconnects BTBMOS A, sets the enable signals EN of the controllable load switches LDSW A-C and LDSW B-C to LOW, and controls LDSW A-C and LDSW B-C to be in the off state. EC sets the enable signal EN of the controllable load switch LDSW A-B to HIGH, and controls LDSW A-B to be in the conduction state.

2. After two power adapters are inserted into USB Type-C A and USB Type-C C respectively, the power adapter inserted into USB Type-C A is pulled out.

In response to inserting two power adapters into USB Type-C A and USB Type-C C respectively, EC rewrites the power supply parameters into the registers of CHARGER1 and CHARGER2 respectively according to the power supply parameters of the two power adapters. EC sets the state of the electronic switch BTBMOS A to LOW, disconnects BTBMOS A, sets the enable signals EN of the controllable load switches LDSW A-C and LDSW B-C to HIGH, and controls LDSW A-C and LDSW B-C to be in the conduction state. EC sets the enable signal EN of the controllable load switch LDSW A-B to LOW, and controls LDSW A-B to be in the off state.

3. After two power adapters are inserted into USB Type-C B and USB Type-C A respectively, the power adapter inserted into USB Type-C B is pulled out.

In response to inserting two power adapters into USB Type-C B and USB Type-C A respectively, EC rewrites the power supply parameters into the registers of CHARGER1 and CHARGER2 according to the power supply parameters of the two power adapters. EC sets the state of the electronic switch BTBMOS B to LOW, disconnects BTBMOS B, sets the enable signals EN of the controllable load switches LDSW A-C and LDSW B-C to LOW, and controls LDSW A-C and LDSW B-C to be in the off state. EC sets the enable signal EN of the controllable load switch LDSW A-B to HIGH, and controls LDSW A-B to be in the conduction state.

4. After two power adapters are inserted into USB Type-C B and USB Type-C C respectively, the power adapter inserted into USB Type-C B is pulled out.

In response to inserting two power adapters into USB Type-C B and USB Type-C C respectively, EC rewrites the power supply parameters into the registers of CHARGER1 and CHARGER2 according to the power supply parameters of the two power adapters. EC sets the state of the electronic switch BTBMOS B to LOW, disconnects BTBMOS B, sets the enable signals EN of the controllable load switches LDSW A-C and LDSW B-C to HIGH, and controls LDSW A-C and LDSW B-C to be in the conduction state. EC sets the enable signal EN of the controllable load switch LDSW A-B to LOW, and controls LDSW A-B to be in the off state.

5. After two power adapters are inserted into USB Type-C C and USB Type-C A respectively, the power adapter inserted into USB Type-C C is pulled out.

In response to inserting two power adapters into USB Type-C C and USB Type-C A respectively, EC rewrites the power supply parameters into the registers of CHARGER1 and CHARGER2 according to the power supply parameters of the two power adapters. EC sets the state of the electronic switch BTBMOS C to LOW, disconnects BTBMOS C, sets the enable signals EN of the controllable load switches LDSW A-C and LDSW B-C to HIGH, and controls LDSW A-C and LDSW B-C to be in the conduction state. EC sets the enable signal EN of the controllable load switch LDSW A-B to LOW, and controls LDSW A-B to be in the off state.

6. After two power adapters are inserted into USB Type-C C and USB Type-C B respectively, the power adapter inserted into USB Type-C C is pulled out.

In response to inserting two power adapters into USB Type-C C and USB Type-C B respectively, EC rewrites the power supply parameters into the registers of CHARGER1 and CHARGER2 according to the power supply parameters of the two power adapters. EC sets the state of the electronic switch BTBMOS C to LOW, disconnects BTBMOS C, sets the enable signals EN of the controllable load switches LDSW A-C and LDSW B-C to LOW, and controls LDSW A-C and LDSW B-C to be in the off state. EC sets the enable signal EN of the controllable load switch LDSW A-B to HIGH, and controls LDSW A-B to be in the conduction state.

Other implementation details of the electronic device shown in FIGS. 5-6 are similar to the implementation details of operations in the embodiment shown in FIG. 3, and will not be repeated herein.

In the method and apparatus of supplying power to the electronic device, and the electronic device of the embodiments of the present disclosure, in response to detecting that the connection state of the power interface of the electronic device changes, the power supply terminal information of the power supply terminal connected to the power interface is determined, and control parameters of the charging power chip of the electronic device is configured at least based on the power supply terminal information. The power supply terminal information includes the number of power supply terminals and the power supply parameter information of the power supply terminals. One or more power interfaces may be provided. The charging power chip may be disposed at the power supply path between the power interface and the power-consuming component of the electronic device, and the control parameters are at least used to control the power transmission between charging power chip and the power-consuming component. As a result, the charging efficiency can be improved. When the power-consuming component of the electronic device substantially consumes power, the electronic device can be charged through multiple power interfaces of the electronic devices without additionally designing a dedicated power interface, thereby reducing charging cost. Further, when the electric power of the electronic device is sufficient, it is also possible to supply power to other electronic devices through the multiple power interfaces of the electronic device. Thus, heat dissipation problems caused by excessive power if only improving the adapter itself can be avoided.

The above description of the embodiments of the control apparatus and the electronic device is similar to the description of the method embodiment shown in FIG. 1, and the control apparatus and the electronic device have beneficial effects similar to the method embodiments shown in FIG. 1. Thus, no further details are given. For technical details not disclosed in the embodiments of the control apparatus and the electronic device of the present disclosure, reference can be made to the description of the method embodiments shown in FIG. 1.

It should be understood that reference throughout the specification to "one embodiment" or "an embodiment" means that a particular feature, structure, or characteristic related to the embodiment is included in at least one embodiment of the present disclosure. Thus, appearances of "in one embodiment" or "in an embodiment" in various places throughout the specification are not necessarily referring to the same embodiment. Furthermore, the particular features, structures or characteristics may be combined in any suitable manner in one or more embodiments. It should be understood that, in various embodiments of the present disclosure, the sequence numbers of the above-described processes do not mean the order of execution, which should be determined by its functions and internal logic, and should not constitutes any limitation on the implementation in the embodiments of the present disclosure. The sequence numbers of the above embodiments of the present disclosure are for description only, and do not represent the advantages and disadvantages of the embodiments.

In the specification, the term "comprising," "including," or any other variation thereof is intended to cover a non-exclusive inclusion such that a process, method, article, or apparatus comprising a set of elements includes not only those elements, but also includes other elements not expressly listed, or elements inherent in the process, method, article, or device. Without further limitations, an element defined by the phrase "comprising a . . . " does not preclude the presence of additional identical elements in the process, method, article, or apparatus comprising that element.

In the embodiments of the present disclosure, it should be understood that the disclosed devices and methods may be implemented in other ways. The device embodiments described above are only illustrative. For example, the division of units is only a logical function division. In actual implementation, there may be other division methods, such as: multiple units or components can be combined or integrated into another system, or some features may be ignored, or not implemented. In addition, the coupling, or direct coupling, or communication connection between the components shown or discussed may be through some interfaces, and the indirect coupling or communication connection of the devices or units may be electrical, mechanical, or in another form.

The units described above as separate components may or may not be physically separated, and the components displayed as units may or may not be physical units. They may be located in one place or distributed to multiple network units. Part or all of the units can be selected according to actual needs to achieve the objective of the technical solution of the embodiments of the present disclosure.

In addition, each functional unit in the embodiments of the present disclosure may be integrated into one processing unit, or each functional unit may be used as one single unit, or two or more units may be integrated into one unit. The above-described integration of the units may be realized in the form of hardware or in the form of hardware plus software functional units.

Those of ordinary skill in the art should understand that all or part of the processes to realize the above-described method embodiments may be completed by hardware executing program instructions, and the program instructions may be stored in computer-readable storage media. When being executed by a processor, the program instructions implement the processes of the above-described method embodiments. The computer-readable storage medium includes: various media capable of storing program codes such as a removable storage device, a read-only memory (ROM), a magnetic disk, or an optical disk.

In some embodiments, if the above-described integrated units of the present disclosure are realized in the form of software function modules and sold or used as standalone products, they can also be stored in the computer-readable storage medium. Based on this understanding, the technical solutions of the embodiments of the present disclosure can be embodied in the form of a software product. The computer software product is stored in the computer-readable storage medium and includes program instructions for causing a computer device (which may be a personal computer, a server, or a network device, etc.) to execute all or part of the remote-control methods in various embodiments of the present disclosure. The computer-readable storage medium includes various media capable of storing program codes such as removable storage devices, ROMs, magnetic disks or optical disks.

The above description of the disclosed embodiments enables those skilled in the art to implement or use the present disclosure. Various modifications to the embodiments will be obvious to those skilled in the art, and the general principles defined herein can be implemented in other embodiments without departing from the spirit or scope of the present disclosure. Therefore, this application will not be limited to the embodiments shown in the specification, but should conform to the broadest scope consistent with the principles and novelties disclosed in the specification.

What is claimed is:

1. A control method comprising:
   in response to detecting that a connection state of one or more power interfaces of an electronic device changes, determining power supply terminal information of one or more power supply terminals connected to the one or more power interfaces, the power supply terminal information including a terminal quantity of the one or more power supply terminals and power supply parameter information of the one or more power supply terminals; and
   configuring one or more control parameters of one or more charging power chips of the electronic device at least based on the power supply terminal information, each of the one or more charging power chips being disposed at one of one or more power supply paths between one of the one or more power interfaces and one of one or more power-consuming components of the electronic device, each of the one or more control parameters at least being used to control power transmission between the one of the one or more charging power chips and the one of the one or more power-consuming components.

2. The control method according to claim 1, wherein configuring the one or more control parameters includes at least one of:

controlling an on-off state of each of the one or more power supply paths based on the terminal quantity, and configuring the one or more control parameters based on the power supply parameter information;

controlling the on-off state of each of the one or more power supply paths based on the terminal quantity, and configuring the one or more control parameters based on the power supply parameter information and power consumption parameter information of the one or more power-consuming components;

controlling the on-off state of each of the one or more power supply paths based on the terminal quantity, and configuring the one or more control parameters based on the power supply parameter information and power consumption demand information of an external device connected to the electronic device; or controlling the on-off state of each of the one or more power supply paths based on the terminal quantity, and configuring the one or more control parameters based on the power supply parameter information and at least one of the power consumption parameter information of the power-consuming component or the power consumption demand information of the external device.

3. The control method according to claim 1, wherein:
the one or more power interfaces include a plurality of power interfaces; and
configuring the control parameter includes controlling a connection state between the plurality of power interfaces and the on-off state of each of the one or more power supply paths based on the terminal quantity.

4. The control method according to claim 1, wherein:
the one or more power supply terminals consists of only one power supply terminal, and the one or more charging power chips include a first charging power chip and a second charging power chip; and
configuring the one or more control parameters includes, in response to the only one power supply terminal being connected to one power interface of the one or more power interfaces, configuring control parameters of the first charging power chip and the second charging power chip based on the power supply parameter information obtained from the only one power supply terminal, such that after the power supply path between the one power interface and the first charging power chip and the power supply path between the one power interface and the second charging power chip are turned on, power is supplied to a first power-consuming component connected to the first charging power chip and a second power-consuming component connected to the second charging power chip.

5. The control method according to claim 4, further comprising at least one of:
in response to obtaining feedback information of at least one of the first power-consuming component or the second power-consuming component, updating the control parameters of the first charging power chip and the second charging power chip based on the feedback information; or
in response to the only one power supply terminal not meeting a power demand of the first power-consuming component, controlling the second power-consuming component to supply power to the first power-consuming component.

6. The control method according to claim 4, further comprising:
in response to obtaining a charging request from an external device connected to the electronic device, controlling at least one of the first power-consuming component or the second power-consuming component to supply power to the external device through at least one of the first charging power chip or the second charging power chip.

7. The control method according to claim 1, wherein:
the one or more power supply terminals include a first power supply terminal and a second power supply terminal, the one or more power interfaces include a first power interface and a second power interface, and the one or more charging power chips include a first charging power chip and a second charging power chip; and
configuring the one or more control parameters includes in response to the first power interface being connected to the first power supply terminal and the second power interface being connected to the second power supply terminal, configuring the control parameters of the first charging power chip and the second charging power chip based on the power supply parameter information obtained from the first power supply terminal and the first power supply terminal, such that after the power supply path between the first power interface and the first charging power chip and the power supply path between the second power interface and the second charging power chip are turned on, power is supplied to a first power-consuming component connected to the first charging power chip and a second power-consuming component connected to the second charging power chip.

8. The control method according to claim 7, further comprising at least one of:
in response to obtaining feedback information of at least one of the first power-consuming component or the second power-consuming component, updating the control parameters of the first charging power chip and the second charging power chip based on the feedback information; or
in response to the first power supply terminal not meeting a power demand of the first power-consuming component, controlling at least one of the second power supply terminal or the second power-consuming component to supply power to the first power-consuming component.

9. The control method according to claim 7, further comprising:
in response to obtaining a charging request from an external device connected to the electronic device, controlling at least one of the first power-consuming component or the second power-consuming component to supply power to the external device through at least one of the first charging power chip or the second charging power chip.

10. A control apparatus comprising:
one or more processors; and
one or more memories storing program instructions that, when executed by the one or more processors, cause the one or more processors to:
in response to detecting that a connection state of one or more power interfaces of an electronic device changes, determine power supply terminal information of one or more power supply terminals connected to the one or more power interfaces, the power supply terminal information including a terminal quantity of the one or more power supply terminals and power supply parameter information of the one or more power supply terminals; and configure one or more control parameters of one or more charging power chips of the electronic device at least based on the power supply terminal information, each of the one or more charging power chips being disposed at one of one or more power supply paths between one of the one or more power interfaces and one of one or more power-consuming components of the electronic device, each of the one or more control parameters at least being used to control power transmission between the one of the one or more charging power chips and the one of the one or more power-consuming components.

11. The control apparatus according to claim 10, wherein when configuring the one or more control parameters, the one or more processors are further configured to:
control an on-off state of each of the one or more power supply paths based on the terminal quantity, and configure the one or more control parameters based on the power supply parameter information;
control the on-off state of each of the one or more power supply paths based on the terminal quantity, and configure the one or more control parameters based on the power supply parameter information and power consumption parameter information of the one or more power-consuming components;
control the on-off state of each of the one or more power supply paths based on the terminal quantity, and configure the one or more control parameters based on the power supply parameter information and power consumption demand information of an external device connected to the electronic device; or
control the on-off state of each of the one or more power supply paths based on the terminal quantity, and configure the one or more control parameters based on the power supply parameter information and at least one of the power consumption parameter information of the power-consuming component or the power consumption demand information of the external device.

12. The control apparatus according to claim 10, wherein:
the one or more power interfaces include a plurality of power interfaces; and
configuring the control parameter includes controlling a connection state between the plurality of power interfaces and the on-off state of each of the one or more power supply paths based on the terminal quantity.

13. The control apparatus according to claim 10, wherein:
the one or more power supply terminals consists of only one power supply terminal, and the one or more charging power chips include a first charging power chip and a second charging power chip; and
configuring the one or more control parameters includes, in response to the only one power supply terminal being connected to one power interface of the one or more power interfaces, configuring control parameters of the first charging power chip and the second charging power chip based on the power supply parameter information obtained from the only one power supply terminal, such that after the power supply path between the one power interface and the first charging power chip and the power supply path between the one power interface and the second charging power chip are turned on, power is supplied to a first power-consuming component connected to the first charging power chip and a second power-consuming component connected to the second charging power chip.

14. The control apparatus according to claim 13, wherein the one or more processors are further configured to:

in response to obtaining feedback information of at least one of the first power-consuming component or the second power-consuming component, update the control parameters of the first charging power chip and the second charging power chip based on the feedback information; or
in response to the only one power supply terminal not meeting a power demand of the first power-consuming component, control the second power-consuming component to supply power to the first power-consuming component.

15. The control apparatus according to claim 13, wherein the one or more processors are further configured to:
in response to obtaining a charging request from an external device connected to the electronic device, control at least one of the first power-consuming component or the second power-consuming component to supply power to the external device through at least one of the first charging power chip or the second charging power chip.

16. The control apparatus according to claim 10, wherein:
the one or more power supply terminals include a first power supply terminal and a second power supply terminal, the one or more power interfaces include a first power interface and a second power interface, and the one or more charging power chips include a first charging power chip and a second charging power chip; and
configuring the one or more control parameters includes in response to the first power interface being connected to the first power supply terminal and the second power interface being connected to the second power supply terminal, configuring the control parameters of the first charging power chip and the second charging power chip based on the power supply parameter information obtained from the first power supply terminal and the first power supply terminal, such that after the power supply path between the first power interface and the first charging power chip and the power supply path between the second power interface and the second charging power chip are turned on, power is supplied to a first power-consuming component connected to the first charging power chip and a second power-consuming component connected to the second charging power chip.

17. The control apparatus according to claim 16, wherein the one or more processors are further configured to:
in response to obtaining feedback information of at least one of the first power-consuming component or the second power-consuming component, update the control parameters of the first charging power chip and the second charging power chip based on the feedback information; or
in response to the first power supply terminal not meeting a power demand of the first power-consuming component, control at least one of the second power supply terminal or the second power-consuming component to supply power to the first power-consuming component.

18. The control apparatus according to claim 16, wherein the one or more processors are further configured to:
in response to obtaining a charging request from an external device connected to the electronic device, control at least one of the first power-consuming component or the second power-consuming component to supply power to the external device through at least one of the first charging power chip or the second charging power chip.

19. An electronic device comprising:
one or more power interfaces for connecting to one or more power supply terminals;
one or more power-consuming components;
one or more charging power chips each disposed at a power supply path between one of the one or more power interfaces and one of the one or more power-consuming components; and
a control circuit configured to:
  monitor power supply terminal information of the one or more power supply terminals; and
  configure one or more control parameters of the one or more charging power chips based on the power supply terminal information to control power transmission between the one or more charging power chips and the one or more power-consuming components, the power supply terminal information including a terminal quantity of the one or more power supply terminals and power supply parameter information of the one or more power supply terminals.

* * * * *